US012646313B2

(12) United States Patent (10) Patent No.: US 12,646,313 B2
Wu et al. (45) Date of Patent: Jun. 2, 2026

(54) FALSE VIDEO DETECTION METHOD AND FALSE VIDEO DETECTION DEVICE USING THE SAME

(71) Applicant: Industrial Technology Research Institute, Hsinchu (TW)

(72) Inventors: Hsiu-Fu Wu, Taoyuan City (TW); Pei-Hsuan Lu, Hsinchu City (TW); Pang-Chieh Wang, Taipei City (TW); Chia Mu Yu, Hsinchu City (TW); Chia-Yi Hsu, Taipei City (TW)

(73) Assignee: Industrial Technology Research Institute, Hsinchu (TW)

( * ) Notice: Subject to any disclaimer, the term of this patent is extended or adjusted under 35 U.S.C. 154(b) by 318 days.

(21) Appl. No.: 18/419,508

(22) Filed: Jan. 22, 2024

(65) Prior Publication Data

US 2025/0182469 A1 Jun. 5, 2025

(30) Foreign Application Priority Data

Dec. 5, 2023 (TW) ................................. 112147171

(51) Int. Cl.
*G06V 10/98* (2022.01)
*G06V 10/77* (2022.01)
(Continued)

(52) U.S. Cl.
CPC ........ *G06V 10/993* (2022.01); *G06V 10/7715* (2022.01); *G06V 10/82* (2022.01); *G06V 20/46* (2022.01)

(58) Field of Classification Search
CPC .. G06V 10/993; G06V 10/7715; G06V 20/46; G06V 10/82; G06V 20/41; G06V 10/454; G06N 3/047; G06N 3/045
See application file for complete search history.

(56) References Cited

U.S. PATENT DOCUMENTS 10,769,480 B2 * 9/2020 Li ........................... G06V 10/82
12,423,975 B2 * 9/2025 Liu ........................ G06V 20/46
(Continued)

FOREIGN PATENT DOCUMENTS

CN 111353399 6/2020
CN 111444881 12/2020
(Continued)

OTHER PUBLICATIONS

Lingzhi Li et al. "Face X-ray for More General Face Forgery Detection", Jun. 2020, IEEE (Year: 2020).*
(Continued)

*Primary Examiner* — John Villecco
*Assistant Examiner* — Alejandro Hernandez
(74) *Attorney, Agent, or Firm* — JCIPRNET

(57) ABSTRACT

A false video detection method is provided. The method includes: retrieving N video segments in a target video, wherein each video segment includes M image frames; performing a feature retrieving procedure on the N×M image frames to obtain feature maps corresponding to the N×M image frames; inputting the feature maps into a time-attention model to obtain concentrated feature; multiplying the concentrated feature with the feature maps to obtain first enhanced feature maps, adding the first enhanced feature maps with the feature maps to obtain second enhanced feature maps, and inputting the second enhanced feature maps into a fully connected layer to obtain a determination result outputted by the fully connected layer, wherein the determination result indicates that the target video is true or false.

16 Claims, 8 Drawing Sheets

(51) Int. Cl.
G06V 10/82 (2022.01)
G06V 20/40 (2022.01)

(56) References Cited

U.S. PATENT DOCUMENTS

| | | | |
|---|---|---|---|
| 2020/0134804 A1* | 4/2020 | Song | G06N 3/08 |
| 2020/0272823 A1 | 8/2020 | Liu et al. | |
| 2020/0285859 A1* | 9/2020 | Feng | G06V 10/82 |
| 2022/0139085 A1* | 5/2022 | Lv | G06F 16/783 |
| | | | 382/156 |
| 2022/0269922 A1* | 8/2022 | Mathews | G06N 3/0464 |
| 2022/0277596 A1 | 9/2022 | Li et al. | |
| 2023/0260164 A1* | 8/2023 | Yuan | G06N 3/0895 |
| | | | 382/157 |
| 2024/0168617 A1* | 5/2024 | Lin | G06F 3/04886 |
| 2024/0169624 A1* | 5/2024 | Brandt | G06T 11/60 |
| 2024/0169685 A1* | 5/2024 | Figueroa | G06T 11/60 |
| 2025/0054324 A1* | 2/2025 | Yao | G06V 10/62 |
| 2025/0061735 A1* | 2/2025 | Gan | G06N 3/0464 |
| 2025/0104423 A1* | 3/2025 | Wen | G06V 10/82 |

FOREIGN PATENT DOCUMENTS

| | | |
|---|---|---|
| CN | 109886130 | 5/2021 |
| CN | 112801037 | 5/2021 |
| CN | 113901909 | 1/2022 |
| CN | 114092864 | 4/2022 |
| CN | 114898432 | 8/2022 |
| CN | 111368764 | 2/2023 |
| CN | 115719462 A * | 2/2023 |
| CN | 115909445 A * | 4/2023 |
| CN | 116486464 | 7/2023 |
| TW | 202307782 | 2/2023 |
| TW | I806199 | 6/2023 |

OTHER PUBLICATIONS

Hanqing Zhao et al., "Multi-attentional Deepfake Detection", 2021 IEEE/CVF Conference on Computer Vision and Pattern Recognition (CVPR), Jun. 20-25, 2021, pp. 2185-2194.

Lingzhi Li et al., "Face X-ray for More General Face Forgery Detection", 2020 IEEE/CVF Conference on Computer Vision and Pattern Recognition (CVPR), Jun. 13-19, 2020, pp. 5001-5010.

Yuezun Li et al., "Celeb-DF: A Large-scale Challenging Dataset for DeepFake Forensics", 2020 IEEE/CVF Conference on Computer Vision and Pattern Recognition (CVPR), Jun. 13-19, 2020, pp. 3207-3216.

Brian Dolhansky et al., "The DeepFake Detection Challenge (DFDC) Dataset", retrieved from arXiv database, arXiv:2006.07397v4 [cs. CV], Oct. 28, 2020, pp. 1-13.

Nicolas Rahmouni et al., "Distinguishing Computer Graphics from Natural Images Using Convolution Neural Networks", 2017 IEEE Workshop on Information Forensics and Security (WIFS), Dec. 4-7, 2017, pp. 1-6.

Ricard Durall et al., "Watch your Up-Convolution: CNN Based Generative Deep Neural Networks are Failing to Reproduce Spectral Distributions", 2020 IEEE/CVF Conference on Computer Vision and Pattern Recognition (CVPR), Jun. 13-19, 2020, pp. 7890-7899.

Joel Frank et al., "Leveraging Frequency Analysis for Deep Fake Image Recognition", ICML'20: Proceedings of the 37th International Conference on Machine Learning, Jul. 13, 2020, pp. 1-12.

Yinglin Zheng et al., "Exploring Temporal Coherence for More General Video Face Forgery Detection", 2021 IEEE/CVF International Conference on Computer Vision (ICCV), Oct. 10-17, 2021, pp. 15044-15054.

"Office Action of Taiwan Counterpart Application", issued on Feb. 13, 2025, p. 1-p. 4.

* cited by examiner

T71

| Detecting method | Training dataset | Testing dataset | |
|---|---|---|---|
| | | Celeb-DF | DFDC |
| EffNet-b7+LSTM | 97.0% | 79.6% | 73.0% |
| EffNet-b7 +TA$^2$ | 98.4% | 84.1% | 81.2% |

T72

| Detecting method | Training dataset | Testing dataset | |
|---|---|---|---|
| | | Celeb-DF | DFDC |
| EffNet-b7 | 89.6% | 63.3% | 64.8% |
| EffNet-b7 +TA | 98.0% | 83.2% | 79.4% |
| EffNet-b7 +TA$^2$ | 98.4% | 84.1% | 81.2% |

FIG. 7

| Disturbing method → Detecting method ↑ | Saturation | Contrast | Block | Noise | Blur | Pixel | Average accuracy |
|---|---|---|---|---|---|---|---|
| Multiple-attention | 97.0% | 86.8% | 92.3% | 53.8% | 55.3% | 67.6% | 75.4% |
| Face X-ray | 97.6% | 88.5% | 99.1% | 49.8% | 63.8% | 88.6% | 81.2% |
| Provided Method | 98.8% | 97.2% | 98.4% | 68.8% | 70.2% | 81.8% | 85.8% |

T81

FALSE VIDEO DETECTION METHOD AND FALSE VIDEO DETECTION DEVICE USING THE SAME

CROSS-REFERENCE TO RELATED APPLICATION

This application claims the priority benefit of Taiwan application serial no. 112147171, filed on Dec. 5, 2023. The entirety of the above-mentioned patent application is hereby incorporated by reference herein and made a part of this specification.

BACKGROUND

Technical Field

The present invention relates to a video detection method and to a false video detection method and a false video detection device using said method.

Description of Related Art

Deepfake detection plays an extremely critical role in the recent digital era, and its industrial value is related not only to public safety and social stability, but also to the protection of personal privacy and data credibility. Therefore, improving the accuracy of Deepfake detection is crucial to curbing the widespread dissemination of malicious or erroneous information.

SUMMARY

An embodiment of the present invention provides a false video detection method performed by a computing device comprising a processor. The method includes: extracting, by the processor, N video segments from a target video, where each video segment contains M image frames; performing, by the processor, a feature extraction procedure on the N×M image frames to obtain a feature map corresponding to the N×M image frames; inputting, by the processor, the feature map into a time attention model to obtain a concentrated feature; performing, by the processor, a multiplication operation to the concentrated feature and the feature map to obtain a first enhanced feature map; performing, by the processor, a summing operation on the first enhanced feature map and the feature map to obtain a second enhanced feature map; and inputting, by the processor, the second enhanced feature map into a fully connected layer to obtain a judgment result outputted by the fully connected layer, wherein the judgment result indicates that the target video is true or false.

A further embodiment of the present invention provides a false video detection device, comprising a processor. The processor is configured to: extract N video segments from a target video, where each video segment contains M image frames; perform a feature extraction procedure on the N×M image frames to obtain a feature map corresponding to the N×M image frames; input the feature map into a time attention model to obtain a concentrated feature; perform a multiplication operation to the concentrated feature and the feature map to obtain a first enhanced feature map; perform a summing operation on the first enhanced feature map and the feature map to obtain a second enhanced feature map; and input the second enhanced feature map into a fully connected layer to obtain a judgment result outputted by the fully connected layer, wherein the judgment result indicates that the target video is true or false.

Based on the above, the present invention provides a false video detection method and a false video detection device that extracts a video segment of a target video, performs feature extraction on the video segment, obtains a corresponding feature map, inputs the feature map into a time attention model, obtains a enhanced feature map, and obtains a judgment result based on the enhanced feature map to determine whether the target video is a real video or a false video. In this way, the time attention model is used to find out whether there are discontinuous fake contents in the target video, so as to efficiently and accurately detect possible fake videos, and thus avoid being deceived by fake videos.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 7 is a schematic diagram illustrating accuracy rates of different detection methods according to an embodiment of the present invention.

DESCRIPTION OF THE EMBODIMENTS

Figure 1:
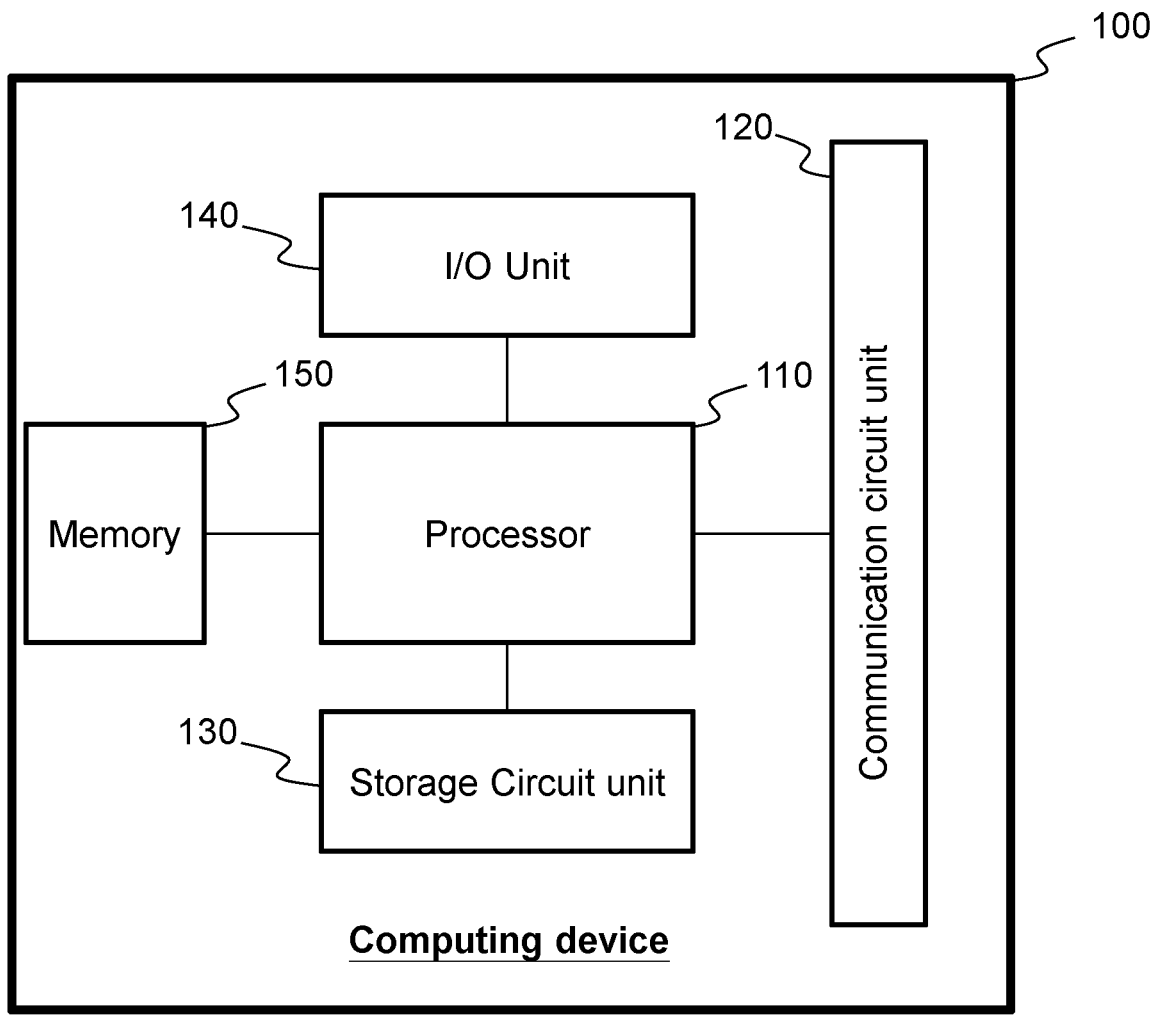
FIG. 1 is a block diagram illustrating a computing device for performing a false video detection method according to an embodiment of the present invention.

Referring to FIG. 1, in the embodiment, the computing device 100 (also known as a false video detection device) includes a processor 110, a communication circuit unit 120, a storage circuit unit 130, an input/output unit (I/O unit) 140, and a memory 150.

The processor 110 is, for example, a Microprogrammed Control Unit, a Central Processing Unit (CPU), a Graphic Processing Unit (GPU), a Programmable Microprocessor, Application Specific Integrated Circuits (ASIC), Programmable Logic Device (PLD), or other similar devices.

A communication circuit unit 120 is configured to transmit or receive data via wired or wireless communication. In the embodiment, the communication circuit unit 120 may have a wireless communication circuit module (not shown) and support one of a combination of Global System for Mobile Communication (GSM) systems, Wireless Fidelity (WiFi) systems, bluetooth communication technologies, or a combination thereof, and is not limited thereto. The processor 110 may receive a target video from the Internet or other electronic device by the communication circuit unit 120.

The input/output unit 140 includes input devices and output devices. The input devices are, for example, a microphone, a touchpad, a touch panel, a keyboard, a mouse, and the like, which are used to allow a user to enter data or to control functions desired by the user. Output devices are, for example, a monitor (which receives data from a display screen to display an image), a speaker (which receives audio data to produce a sound effect), and so on, without limitation. In one embodiment, the input/output unit 140 may include a touch screen. The touch screen is configured to display various information and control interfaces. The input/output unit 140 may display a target video or a judgment result.

The storage circuit unit 130 may store data as instructed by the processor 110. The storage circuit unit 130 includes any type of hard disk drive (HDD) or non-volatile memory storage device (e.g., solid-state drive SSD or flash memory). The storage circuit unit 130 may store target videos as well as various algorithmic models provided in the embodiment.

Memory 150 is configured to temporarily store instructions or data performed by processor 110. The memory 150 is, for example, a Dynamic Random Access Memory (DRAM), a Static Random Access Memory (SRAM), and the like. In the embodiment, the processor 110 may temporarily store various models, deduction data, feature data, video data, data sequences performed in the memory 150.

Figure 2:
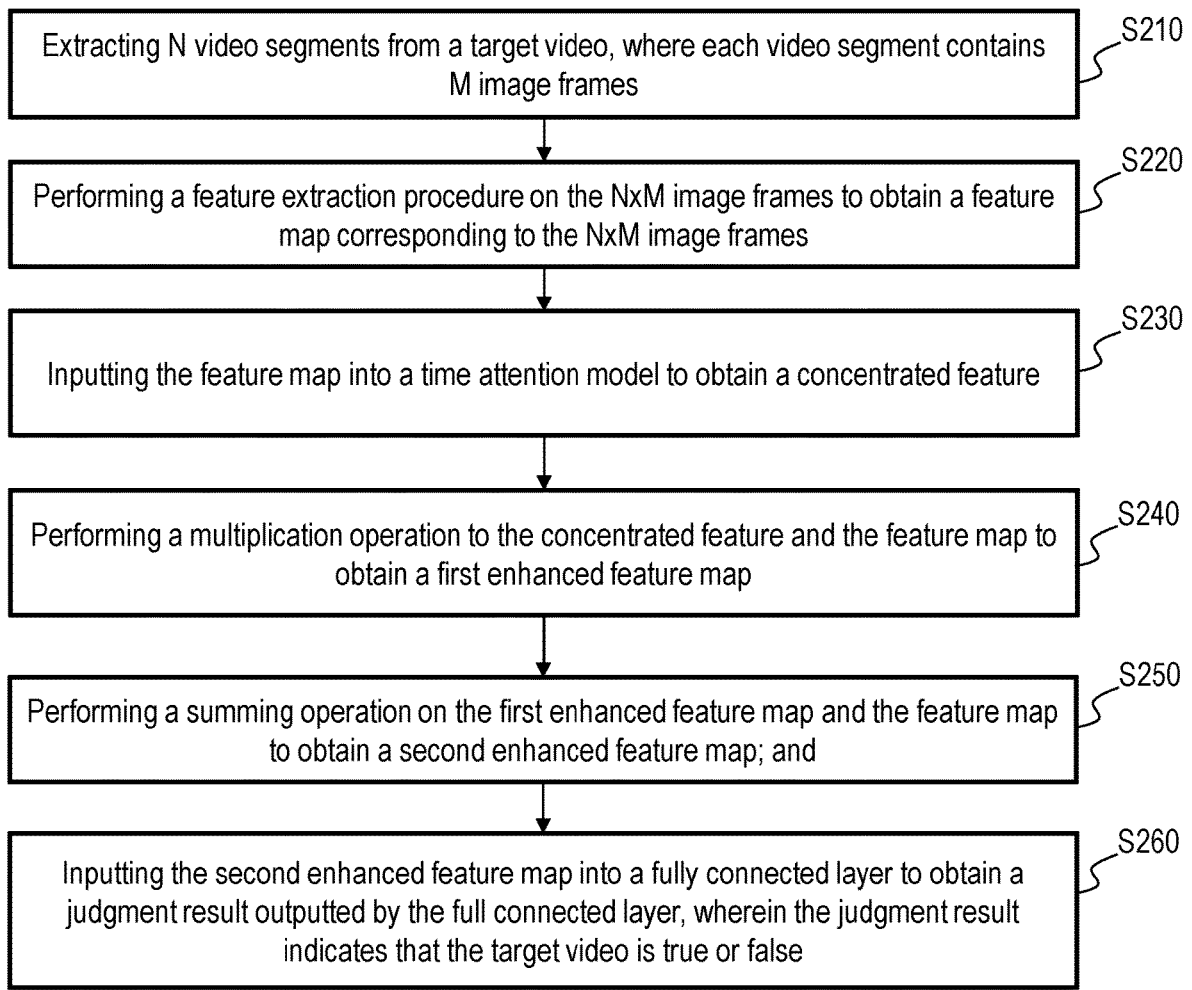
FIG. 2 is an operation flowchart illustrating a false video detection method according to an embodiment of the present invention.

Referring to FIG. 2, in step S210, the processor 110 extracts N video segments from a target video, where each video segment contains M image frames.

Figure 3:
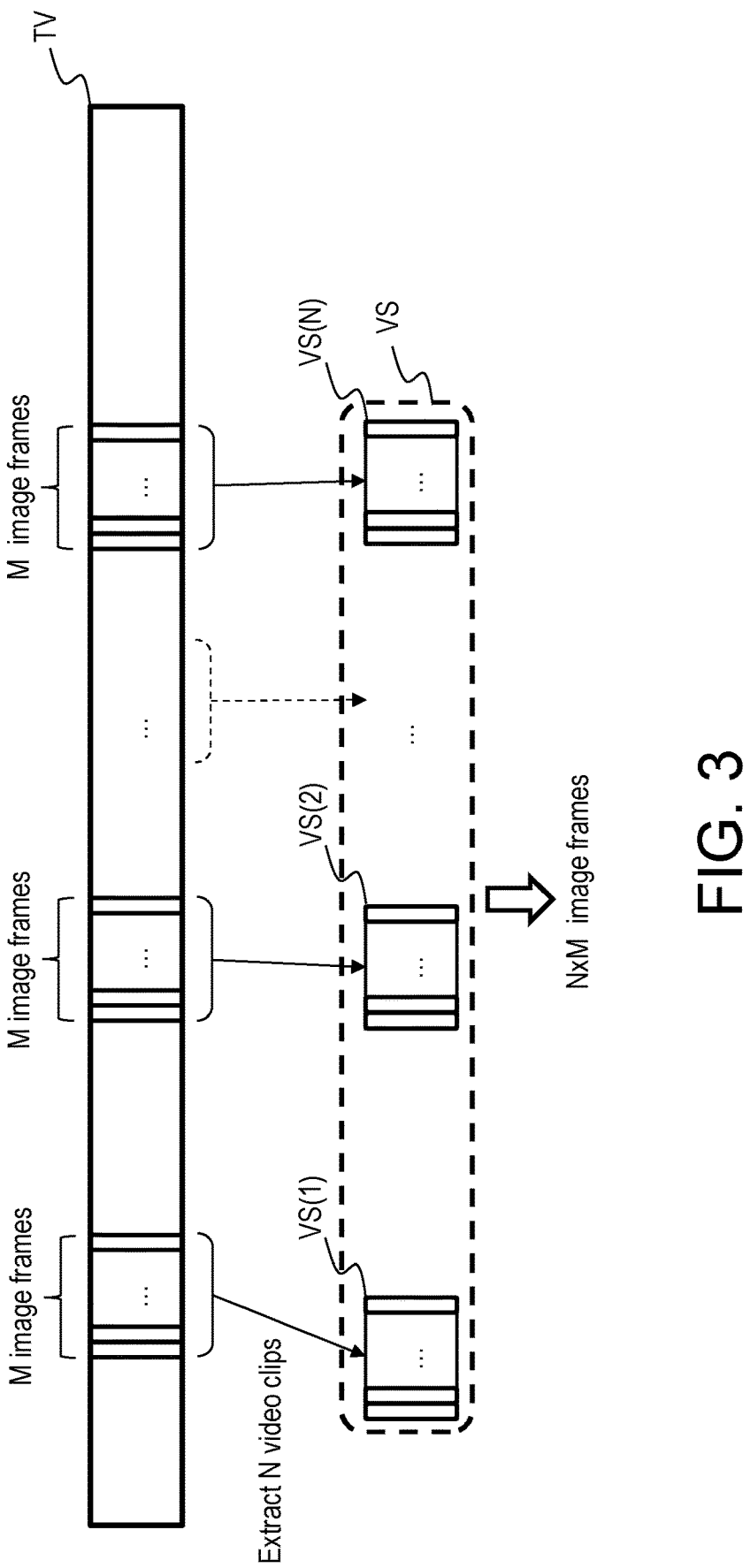
FIG. 3 is a schematic diagram illustrating extracting N video segments of a target video according to an embodiment of the present invention.

For example, referring to FIG. 3, the processor 110 may randomly select N video segments VS(1)~VS(N) in the target video TV. Each of these video segments has the same number of video frames, M. That is, the processor 110 extracts (or clips) a total of N×M video frames VS. N is, for example, 8 or some other positive integer, and M is, for example, 16 or some other positive integer greater than one.

Referring back to FIG. 2, in step S220, the processor 110 performs a feature extraction procedure on the N×M image frames to obtain a feature map corresponding to the N×M image frames.

In detail, the feature extraction procedure includes: performing a data preprocessing operation on the N×M image frames to obtain a first image sequence; performing a first reshaping operation on the first image sequence to obtain a second image sequence; inputting the second image sequence into a pre-trained neural network model to obtain a first feature sequence; performing a second reshaping operation on the first feature sequence to obtain a second feature sequence; and inputting the second feature sequence into an average pooling layer to obtain the feature map corresponding to the N×M image frames.

Figure 4:
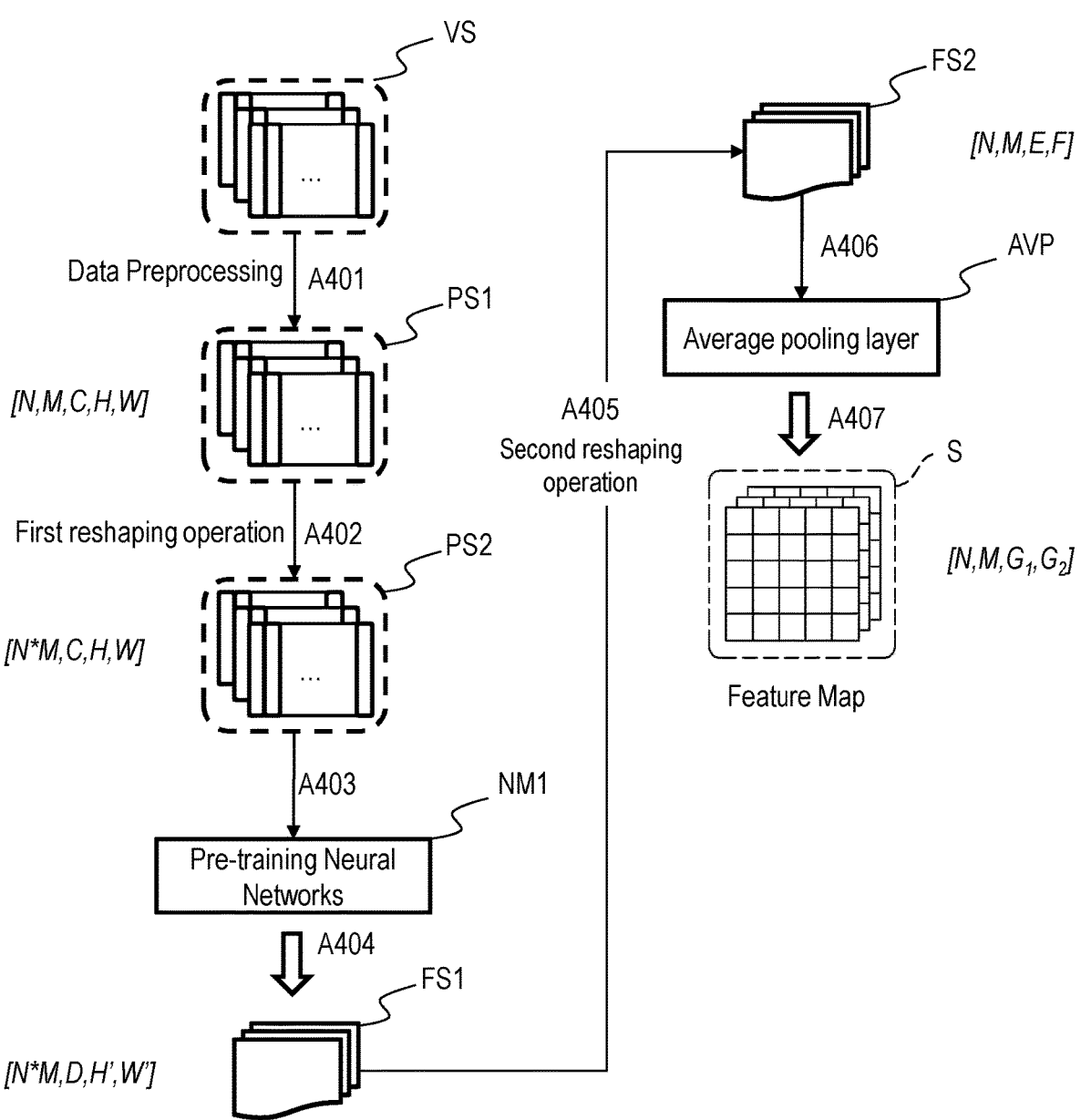
FIG. 4 is a schematic diagram illustrating obtaining a feature map via a feature extraction procedure according to an embodiment of the present invention.

Referring to FIG. 4, the processor 110 performs a data preprocessing operation (A401) on the N×M image frames VS to obtain a first image sequence PS1. The first image sequence PS1 may be represented by a vector, e.g., a vector having a size of [N,M,C,H,W]. Wherein N is the number of video segments, M is the number of image frames in each video segment, C is the number of color channels (e.g., for pixel information in three-primary colors, the number of color channels is 3), H is the height of each image frame (the number of pixels in the first direction), and W is the width of each image frame (the number of pixels in the second direction).

In the embodiment, the data preprocessing operation includes: performing a normalization operation on each of the N×M image frames such that each pixel of each image frame has a value between 0 and 1; and performing a data expansion operation on each of normalized N×M image frames to obtain that first image sequence.

For example, the target video is extracted as 8 video segments (batch=8) with a sequence length of 16 (each video segment has 16 image frames). Each of the N×M image frames of the 300×300 three-channel color image (300×300×3) clipped from the target video is normalized, so that the value of each pixel is between 0 and 1, and data expansion operations (including Gaussian Blur, Vertical Rollover, Random Brightness Contrast, Pan Zoom Rotation, and Fill) are performed. Finally, the N×M image frames VS, for example, form a first image sequence PS1 with a size of [8,16,3,300,300]. Wherein, N is 8, M is 16, C is 3, H is 300, and W is 300.

Next, the processor 110 performs a first reshaping operation (A402) on the first image sequence PS1 to obtain a second image sequence PS2. The first reshaping operation includes performing a dimension decreasing (reduction) operation on the first image sequence to obtain the second image sequence.

The second image sequence PS2 may be represented by a vector, e.g., a vector having a size of [N*M,C,H,W]. It should be noted that, by the first reshaping operation, the second image sequence PS2 is reduced by one dimension compared to the first image sequence PS1. The size of the vector dimension of the second image sequence PS2 is, for example, [8*16,3,300,300].

Next, the processor 110 inputs the second image sequence PS2 into the pre-trained neural network model NM1 (A403) to obtain the first feature sequence FS1 (A404). The first feature sequence FS1 may be represented by a vector, e.g., a vector having a size of [N*M,D,H',W']. In the embodiment, D is, for example, a channel of the feature map, H' is, for example, a height of the feature map, and W' is, for example, a width of the feature map.

In the embodiment, the pre-trained neural network model NM1 comprises one of the following: a ResNet model, an EffNet model, a VGG16 model, an InceptionV3 model, an Xception model, wherein the pre-trained neural network model performs a feature extraction on the inputted second image sequence to obtain the first feature sequence FS1. Assuming the pre-trained neural network model is EffNet-b7. the second image sequence PS2 with the size of [8*16, 3,300,300] is inputted into the pre-trained neural network model EffNet-b7, which finally outputs the first feature sequence FS1, and the size of the vector dimension of the first feature sequence FS1 is, for example, [8*16,2560,10, 10], where N is 8, M is 16, D is 2560, H' is 10, and W' is 10, where 2560 represents the number of channels of the feature map, and (10, 10) represents the height and width of the feature map. In other words, after being processed by the EffNet-b7 model, each inputted image will be converted to a feature map with a size of 2560×10×10. Such a feature map contains high-level features extracted from the original image.

Next, the processor 110 performs a second reshaping operation (A405) on the first feature sequence FS1 to obtain a second feature sequence FS2. The second feature sequence FS2 may be represented by vectors, e.g., with a vector size of [N,M,E,F]. The vector size of the second feature sequence FS2 is, for example, [8,16,320,400]. In the embodiment, E is, for example, a height of the feature map; F is, for example, a width of the feature map.

Next, the processor 110 inputs the second feature sequence FS2 to the average pooling layer AVP (A406) to obtain a feature map S (A407) corresponding to the N×M image frames VS. The parameters of Average Pooling layer AVP are, for example, Kernel size=(20,24) and Stride=None. The average pooling layer AVP can perform further dimensionality reduction on the second feature sequence FS2 in order to reduce the computation complexity, which in turn reduces the sensitivity of the subsequent convolutional layer to the positional information. The feature map S can be represented using vectors, e.g., vector dimension size of $[N,M,G_1,G_2]$. In the implementation, $G_1$ is, for example, a height of the feature map; $G_2$ is, for example, a width of the feature map. In the example, the vector dimension size of the feature map S is, for example, [8,16,16,16]. After the obtained feature map S is inputted into the time attention module, the result is then multiplied with the feature map S by element-wise multiplication (multiplication between elements), and finally added with the feature map S to obtain the final enhanced features for determining whether the target video is a fake (false) video.

Referring back to FIG. 2, in step S230, the processor 110 inputs the feature map S into the time attention model TA to obtain a concentrated feature CF. In step S240, the processor 110 multiplies the concentrated feature CF with the feature map S to obtain a first enhanced feature map ES1. In step S250, the processor 110 adds the first enhanced feature map ES1 to the feature map S to obtain a second enhanced feature map ES2. Finally, in step S260, the processor 110 inputs the second enhanced feature map ES2 into the fully connected layer FCL to obtain a judgment result outputted by the fully connected layer FCL, wherein the judgment result indicates that the target video is true or false (T/F).

A judgment result determined as true indicates that the target video is a real video that does not contain any of faked content. A judgment result determined as false indicates that the target video is a false video that contains faked content, wherein the false video was the real video with only the original content before the faked content was added. In other words, a real video is a video that is made/captured from actual scenes, real performances, or real-life photography, which presents actual scenes, people, and events rather than other special effects, such as those created by Deepfake technology.

The details associated with steps S230~S260 are described below utilizing FIGS. 5 and 6.

Figure 5:
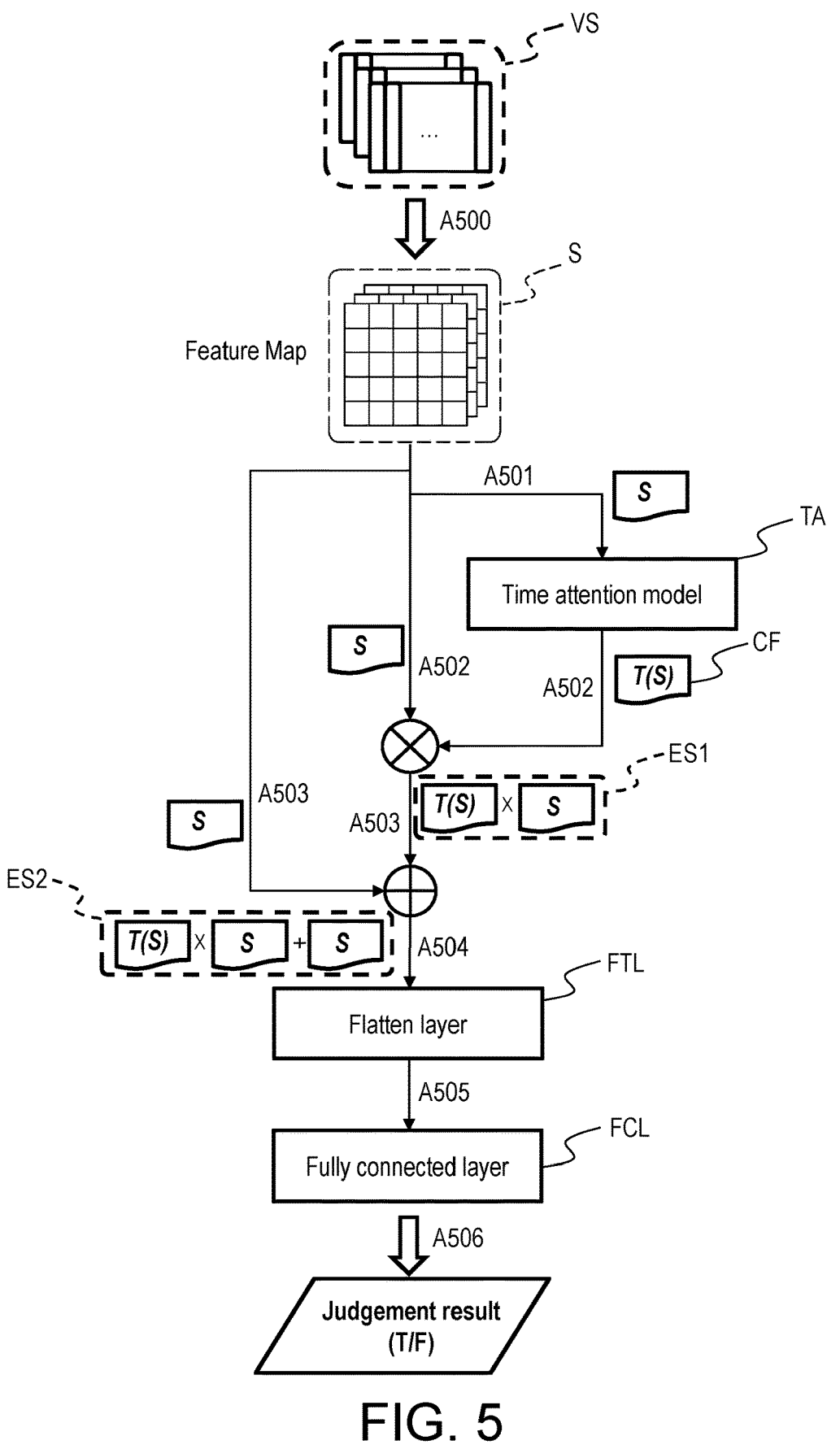
FIG. 5 is a schematic diagram illustrating a false video detection method according to an embodiment of the present invention.

Referring to FIG. 5, first, as described above, the processor 110 performs a feature extraction procedure on the extracted image frames VS (i.e., N×M image frames) of the target video (for verification) to obtain a feature map S (A500).

The processor 110 inputs the feature map S into the time attention model TA (A501 or S230) to obtain the concentrated feature CF (also denoted as T(S)). The concentrated feature CF may be expressed using the following equation:

$$T(S) = \text{Sigmoid}(Conv1 \times 1(Avg.\,\text{Pooling}(S)) + Conv1 \times 1(\text{Max.\,Pooling}(S)))$$

Next, the processor 110 performs a multiplication operation (A502 or S240) between the concentrated feature CF and the feature map S to obtain first enhanced feature map ES1. The first enhanced feature map ES1 is, for example, T(S)×S. The multiplication is done here with T(S) automatically replicating the third and fourth dimensions, which can be done, for example, by using the function torch.tile, i.e. torch.tile(T(S), [1,1,16,16]). Specifically, in PyTorch, the torch.tile function can copy a tensor along a specified direction. This function is often used to extend the size of a tensor or to copy its contents. In other words, this function is used to duplicate the contents of a tensor along a specific direction.

Next, the processor 110 performs an adding operation (A503 or S250) on the first enhanced feature map ES1 with the feature map S to obtain a second enhanced feature map ES2. The second enhanced feature map ES2 is, e.g., (T(S)×S+S).

Finally, in step S260, the processor 110 inputs the second enhanced feature map ES2 to the flatten layer FTL (A504), and then inputs the output result to the fully connected layer FCL (A505) to obtain the judgment result output by the fully connected layer FCL (A506). In other words, steps A505 to A506 are to use a flatten layer to expand the input second-enhanced feature map ES2 into [8*16*16*16*16,1], and connect the fully connected layer (1 neuron) in series. The time attention model TA and the fully connected layer FCL are trained by using the cross entropy (which is used in binary classification) function as the loss function. To be more specific, the output of the time attention model TA is passed through the fully connected layer FCL for linear combination of weights, and the output of the fully connected layer FCL usually contains activation functions, such as Sigmoid function or Softmax function, to generate the final classification result. The Loss Function, which is the target function in the training process, is used to measure the difference between the model prediction result and the actual labeling. For binary classification, the Binary Cross-Entropy Loss is often used. This loss function is used for measuring the distance between two probability distributions and is particularly suitable for binary classification problems. The training process of the model consists of a Forward Propagation calculation prediction, followed by a Cross-Entropy Loss function that calculates the difference between the prediction and the actual labeling. Next, the weights of the model are updated by Backward Propagation and optimization algorithms to minimize the loss. This process is repeated until the model converges.

In another embodiment, the processor 110 inputs the feature map S into the enhanced time attention model to obtain the enhanced concentrated feature or into the time attention model twice to obtain the enhanced concentrated feature. The enhanced time attention model is twice the time attention model TA. For example, the enhanced concentrated feature is $T(S)^2$. In the embodiment, the first enhanced feature map ES1 obtained subsequently is, for example, $T(S)^2 \times S$, and the second enhanced feature map ES2 is, for example, $(T(S)^2 \times S + S)$.

Figure 6:
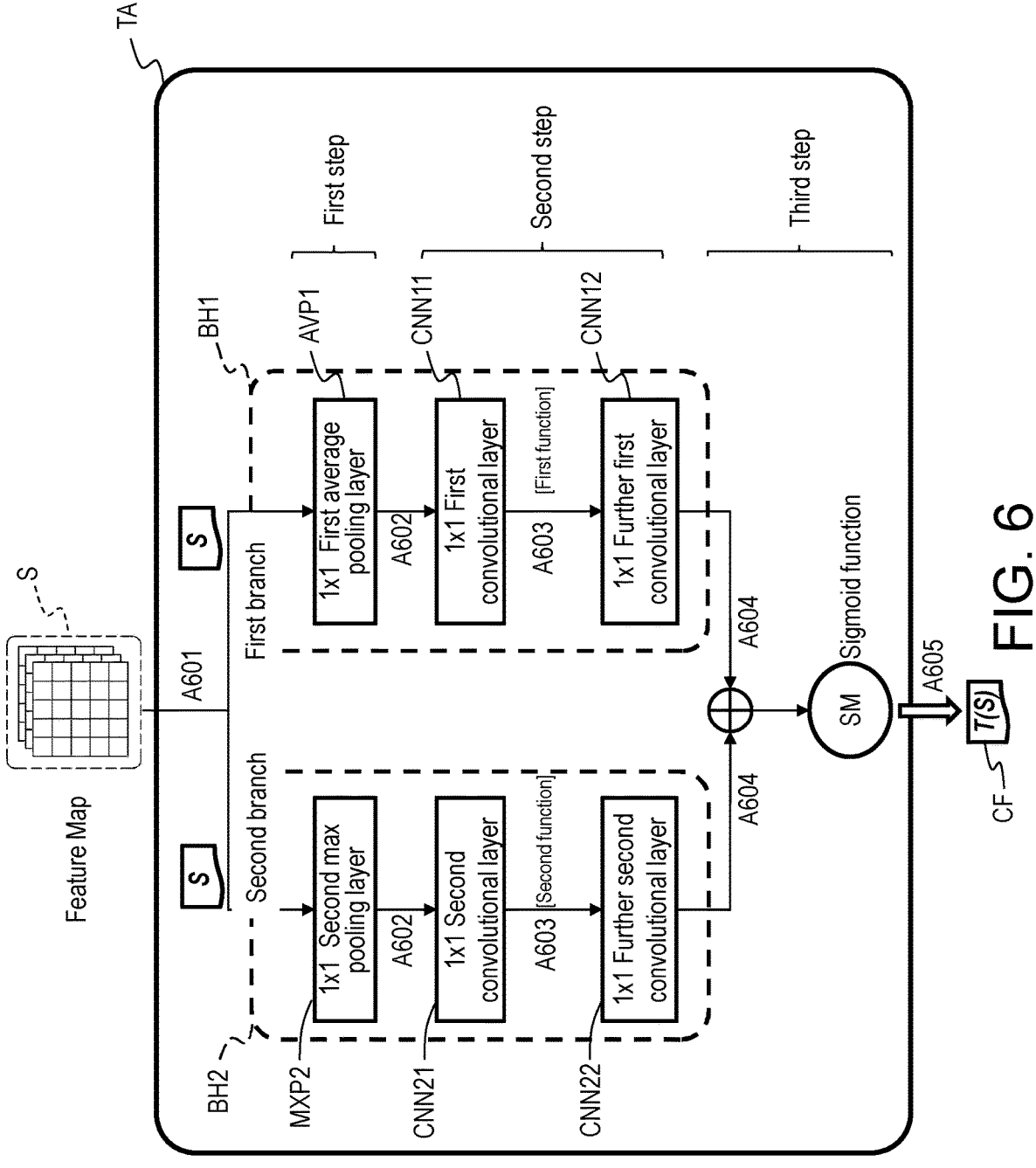
FIG. 6 is a schematic diagram illustrating the operation of a time attention module according to an embodiment of the present invention.

To be more specific, referring to FIG. 6, the time attention model TA includes: a first branch BH1, a second branch BH2, and a sigmoid function SM. The first branch BH1 includes a first average pooling layer AVP1, a first convolutional layer CNN11, a first function, a further first convolutional layer CNN12. The second branch BH2 includes a second max pooling layer MXP2, a second convolutional layer CNN21, a second function, a further second convolutional layer CNN22.

Via the processor 110, the feature map S is inputted into the first average pooling layer AVP1 of the first branch BH1 and into the second maximum pooling layer MXP2 (A601) of the second branch BH2, respectively.

Next, the outputs of the first average pooling layer AVP1 and the second maximum pooling layer MXP2 are input to the first convolutional layer CNN11 and the second convolutional layer CNN21 (A602), respectively.

For example, the first average pooling layer AVP1 (with parameters, such as, kernel size=1×1, strides=(16,16)), down-samples the feature map S, reduces the parameters and removes redundant information and retains the overall data features, and then inputs them to the first convolutional layer CNN11 (kernel size=1×1, strides=1), then processed by the first function, and then inputs the processed result to the further first convolutional layer CNN12 (kernel size=1×1, strides=1) (A603), so as to obtain the output of the first branch BH1, e.g., [8,16,1,1].

For example, the second max pooling layer MXP2 (pooling size=1×1, strides=(16,16)) down-samples the feature map S, reduces the parameters and removes the redundant information to retain the important data features, and then inputs them to the second convolutional layer CNN21 (kernel size=1×1, strides=1), then processed by a second function, and then inputs the processed result to the further second convolutional layer CNN22 (kernel size=1×1, strides=1) (A603) to obtain the output of the second branch BH2, whose vector dimension size is for example [8,16,1,1].

Finally, the outputs of the first branch BH1 and the second branch BH2 are summed (A604), and the summed results are input into the sigmoid function SM to output the concentrated feature CF (A605). The size of the vector dimension of the concentrated feature CF is, for example, [8,16, 1,1].

Briefly, the time attention model performs three steps. In the first step, the average pooling layer and the max pooling layer are used to reduce the height and width to 1, perform feature downscaling, and extract the key features. In the second step, two 1×1 convolutions are used and the first and second functions are adopted. In the third step, after the final summation, the summation result is processed by the sigmoid function SM to obtain the concentrated feature CF. That is, by adding the outputs of the two branches of the feature map S through the max pooling layer, the average pooling layer, and the convolutional layers, and then computing the time-dimension-based attention graph (concentrated feature CF) through the Sigmoid function, the goal is to further capture the time-discontinuous features in the Deepfake videos.

Additionally, using two branches corresponding to the average pooling layer and the max pooling layer, key features can be extracted and the number of parameters of the model can be drastically reduced. This is particularly important for large models because the greater the number of parameters in the model, the more computational resources and memory space are required. By reducing the number of model parameters, the detection model can be processed and trained more efficiently. On the other hand, the purpose of using two 1×1 convolutional layers for each branch is that the first one is used to reduce the number of dimensions and the second one is used to increase the number of dimensions. In this way, the complexity of the whole model can be effectively controlled.

It should be noted that in the embodiment, the first function and the second function include one of the following: a Leaky ReLU function, a PReLU function, a RReLU function, and a SELU function. The first and second functions are used to solve the Dead ReLU Problem (also called as "dead neuron" problem). The traditional ReLU function sets the gradient to 0 in the negative part, which may cause the neuron unable to update in the subsequent training process, which is called the Dead ReLU Problem. The functions listed above can solve the "dead neuron" problem.

Notably, the time attention model provided by the embodiments of the present invention can, compared to traditional way using only one fully connected (FC) layer, reduce the number of model parameters used to one-eighth of the traditional way. In addition, the time attention model computes concentrated features based on the time dimension, which is intended to further capture temporal discontinuities in the faked video, and reduces the number of model parameters, increasing the effectiveness of the detection model and the training efficiency.

The accuracy of the false video detection method provided by the present invention is illustrated below using FIGS. 7 and 8.

Referring to FIG. 7, as shown in Table T71, the conventional detection method uses EffNet-b7 as a pre-trained model to obtain feature maps and an LSTM algorithm to perform false video determination on the feature maps; the detection method provided in the embodiment uses EffNet-b7 as a pre-trained model to obtain feature maps, and uses a twice (double) time-attention model TA2 to determine whether the feature maps is a false video. If the training dataset is used for testing, the judgment/determination accuracy of the traditional method and the proposed method are 97% and 98.4%, respectively (as shown by table T71). A FaceForensics++ (FF++) training dataset consisting of 1,000 real videos and 4,000 fake videos is used to train the model. The fake videos in the training dataset are generated by four different Deepfake techniques: Deepfake (DF)1, FaceSwap (FS)2, Face2Face (F2F) and NeuralTexture (NT).

If another test dataset Celeb-DF is used (Y. Li, X. Yang, P. Sun, H. Qi and S. Lyu, *"Celeb-DF: A Large-Scale Challenging Dataset for DeepFake Forensics,"* 2020 *IEEE/ CVF Conference on Computer Vision and Pattern Recognition (CVPR)*, Seattle, WA, USA, 2020, pp. 3204-3213, doi: 10.1109/CVPR42600.2020.00327) to test, the judgment accuracy was 79.6% for the conventional method and 84.1% for the present method. If the test dataset DFDC (*DeepFake Detection Challenge Dataset*: Dolhansky, Brian, et al. *"The deepfake detection challenge (dfdc) dataset."* arXiv preprint arXiv:2006.07397 (2020)) is used for the testing, the judgment accuracy of the traditional method and the proposed method are 73% and 81.2% respectively. From the above test results, it can be seen that the accuracy of the traditional method is high for "trained" dataset, but the accuracy of the traditional method decreases dramatically for "untrained" test datasets. That is, the detection method provided by the present embodiment via the use of the time attention model is more generalizable (better generalization capability).

On the other hand, the accuracy rates recorded in Table T72 may reflect that the number of times the time attention model is used affects the accuracy rate when the same pre-trained model is used. It can be seen that the accuracy rate of the detection method using the time attention model twice (EffNet-b7+TA$^2$) will be higher than that of the detection method using the time attention model only once (EffNet-b7+TA) (as shown in Table T72), and even more dramatically exceeds the accuracy rate of the detection method not using the time attention model (EffNet-b7).

Figure 8:
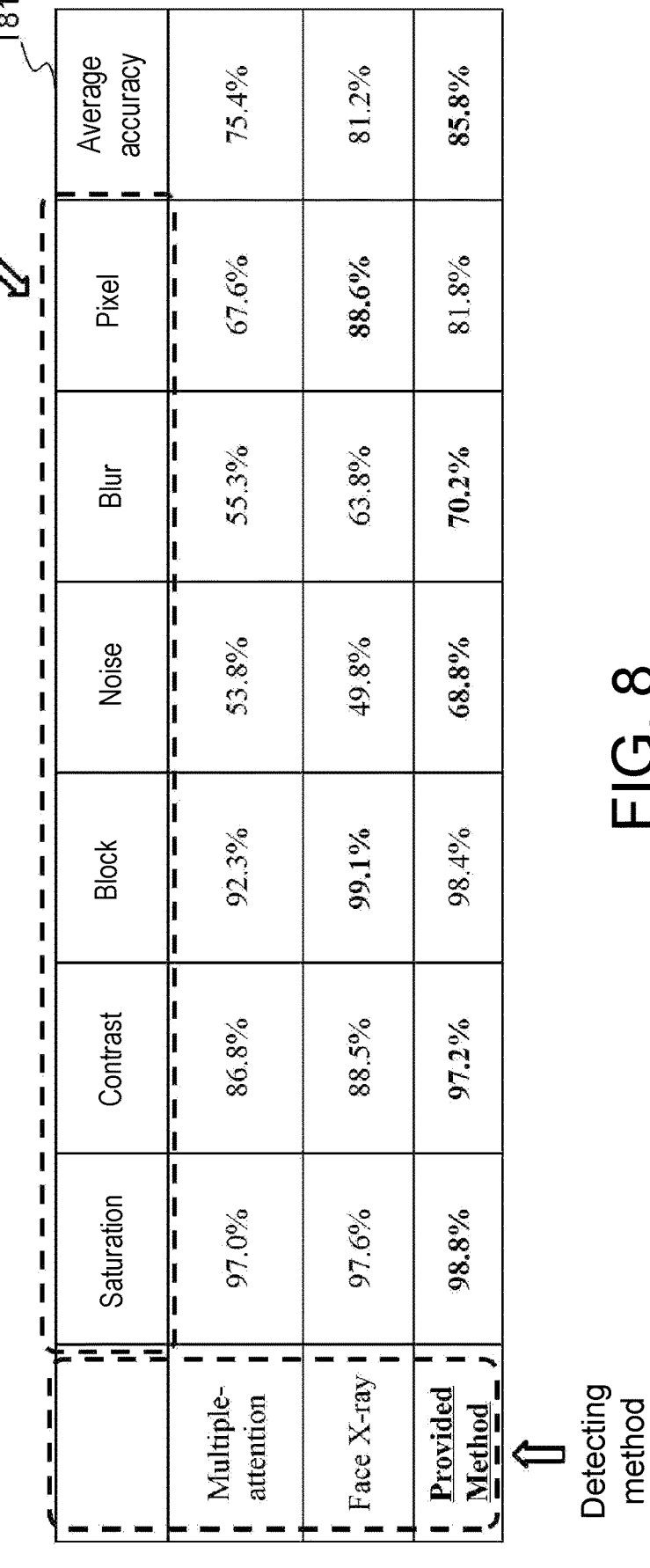
FIG. 8 is a schematic diagram illustrating accuracy rates of different detection methods for different image disturbances according to an embodiment of the present invention.

Referring to FIG. 8, as shown in Table T81, the detection method provided in the present embodiment is compared to a conventional detection method (Multiple-attention [Hanging Zhao, Wenbo Zhou, Dongdong Chen, Tianyi Wei, Weiming Zhang, and Nenghai Yu, *"Multiattentional deepfake detection,"* in Proceedings of the IEEE/CVF conference on computer vision and pattern recognition, 2021, pp. 2185-

2194], Face X-ray [Lingzhi Li, Jianmin Bao, Ting Zhang, Hao Yang, Dong Chen, Fang Wen, and Baining Guo, *"Face x-ray for general face detection,"* in *Proceedings of the IEEE/CVF conference on computer vision and pattern "Face x-ray for more general face forgery detection," in Proceedings of the IEEE/CVF conference on computer vision and pattern recognition,* 2020, pp. 5001-5010]), the tolerance ability of the provided method to interference will also be stronger. In other words, the average accuracy of the provided method for determining whether a target video is false or not is the highest under different interference circumstances.

Based on the above, the present invention provides a false video detection method and a false video detection device that extracts a video segment of a target video, performs feature extraction on the video segment, obtains a corresponding feature map, inputs the feature map into a time attention model, obtains a enhanced feature map, and obtains a judgment result based on the enhanced feature map to determine whether the target video is a real video or a false/fake video. In this way, the time attention model is used to find out whether there are temporal discontinuous fake contents in the target video, so as to efficiently and accurately detect possible fake videos, and thus avoid being deceived by fake videos.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A false video detection method, performed by a computing device comprising a processor, the method comprising:

extracting, by the processor, N video segments from a target video, wherein each video segment contains M image frames;

performing, by the processor, a feature extraction procedure on the N×M image frames to obtain a feature map corresponding to the N×M image frames;

inputting, by the processor, the feature map into a time attention model to obtain a concentrated feature;

performing, by the processor, a multiplication operation to the concentrated feature and the feature map to obtain a first enhanced feature map;

performing, by the processor, a summing operation on the first enhanced feature map and the feature map to obtain a second enhanced feature map; and inputting, by the processor, the second enhanced feature map into a fully connected layer to obtain a judgment result outputted by the fully connected layer, wherein the judgment result indicates that the target video is true or false.

2. The false video detection method of claim 1, wherein the step of performing the feature extraction procedure on the N×M image frames to obtain the feature map corresponding to the N×M image frames comprises:

performing a data preprocessing operation on the N×M image frames to obtain a first image sequence;

performing a first reshaping operation on the first image sequence to obtain a second image sequence;

inputting the second image sequence into a pre-trained neural network model to obtain a first feature sequence;

performing a second reshaping operation on the first feature sequence to obtain a second feature sequence; and inputting the second feature sequence into an average pooling layer to obtain the feature map corresponding to the N×M image frames.

3. The false video detection method of claim 2, wherein the data pre-processing operation comprises:

performing a normalization operation on each of the N×M image frames such that each pixel of each image frame has a value between 0 and 1; and performing a data expansion operation on each of normalized N×M image frames to obtain that first image sequence.

4. The false video detection method of claim 2, wherein the first reshaping operation comprises performing a dimension decreasing operation on the first image sequence to obtain the second image sequence.

5. The false video detection method of claim 2, wherein the pre-trained neural network model comprises one of: a ResNet model, an EffNet model, a VGG16 model, an InceptionV3 model, an Xception model, wherein the pre-trained neural network model performs a feature extraction on the inputted second image sequence to obtain the first feature sequence.

6. The false video detection method of claim 1, wherein the time attention model comprises:

a first branch comprising a first average pooling layer, a first convolutional layer, a first function, and a further first convolutional layer;

a second branch comprising a second maximum pooling layer, a second convolutional layer, a second function, a further second convolutional layer; and a sigmoid function, wherein the feature map is inputted to that first average pooling layer and that second maximum pooling layer of that first branch and that second branch, respectively, and outputted results of the first branch and the second branch are summed and inputted into the sigmoid function to output the concentrated feature.

7. The false video detection method of claim 6, wherein the first function and the second function comprise one of: a Leaky ReLU function, a PReLU function, a RReLU function, and a SELU function.

8. The false video detection method of claim 1, wherein a judgment result determined as true indicates that the target video is a real video that does not contain any of faked content, and a judgment result determined as false indicates that the target video is a false video that contains faked content, wherein the false video was the real video with only the original content before the faked content was added.

9. A false video detection device, comprising:

a processor, wherein the processor is configured to:

extract N video segments from a target video, wherein each video segment contains M image frames;

perform a feature extraction procedure on the N×M image frames to obtain a feature map corresponding to the N×M image frames;

input the feature map into a time attention model to obtain a concentrated feature;

perform a multiplication operation to the concentrated feature and the feature map to obtain a first enhanced feature map;

perform a summing operation on the first enhanced feature map and the feature map to obtain a second enhanced feature map; and input the second enhanced feature map into a fully connected layer to obtain a judgment result outputted by the fully connected layer, wherein the judgment result indicates that the target video is true or false.

10. The false video detection device of claim 9, wherein the step of performing the feature extraction procedure on the N×M image frames to obtain the feature map corresponding to the N×M image frames comprises:

performing a data preprocessing operation on the N×M image frames to obtain a first image sequence;

performing a first reshaping operation on the first image sequence to obtain a second image sequence;

inputting the second image sequence into a pre-trained neural network model to obtain a first feature sequence;

performing a second reshaping operation on the first feature sequence to obtain a second feature sequence; and inputting the second feature sequence into an average pooling layer to obtain the feature map corresponding to the N×M image frames.

11. The false video detection device of claim 10, wherein the data pre-processing operation comprises:

performing a normalization operation on each of the N×M image frames such that each pixel of each image frame has a value between 0 and 1; and performing a data expansion operation on each of normalized N×M image frames to obtain that first image sequence.

12. The false video detection device of claim 10, wherein the first reshaping operation comprises performing a dimension decreasing operation on the first image sequence to obtain the second image sequence.

13. The false video detection device of claim 10, wherein the pre-trained neural network model comprises one of: a ResNet model, an EffNet model, a VGG16 model, an InceptionV3 model, an Xception model, wherein the pre-trained neural network model performs a feature extraction on the inputted second image sequence to obtain the first feature sequence.

14. The false video detection device of claim 9, wherein the time attention model comprises:

a first branch comprising a first average pooling layer, a first convolutional layer, a first function, and a further first convolutional layer;

a second branch comprising a second maximum pooling layer, a second convolutional layer, a second function, a further second convolutional layer; and a sigmoid function, wherein the feature map is inputted to the first average pooling layer and the second maximum pooling layer of the first branch and the second branch, respectively, and outputted results of the first branch and the second branch are summed and inputted into the sigmoid function to output the concentrated feature.

15. The false video detection device of claim 14, wherein the first function and the second function comprise one of: a Leaky ReLU function, a PReLU function, a RReLU function, and a SELU function.

16. The false video detection device of claim 9, wherein a judgment result determined as true indicates that the target video is a real video that does not contain any of faked content, and a judgment result determined as false indicates that the target video is a false video that contains faked content, wherein the false video was the real video with only the original content before the faked content was added.

* * * * *